(12) United States Patent
Lange et al.

(10) Patent No.: US 7,484,720 B2
(45) Date of Patent: Feb. 3, 2009

(54) TEMPERATURE COMPENSATING VALVE ASSEMBLY

(75) Inventors: Daniel Lange, Charlotte, NC (US);
Anthony Haba, Clarkston, MI (US);
Brian Cann, Port Huron, MI (US);
David Sabet, Ferndale, MI (US); Jason Lynch, Belmont, NC (US)

(73) Assignee: Stabilus, Inc., Gastonia, NC (US)

( * ) Notice: Subject to any disclaimer, the term of this patent is extended or adjusted under 35 U.S.C. 154(b) by 87 days.

(21) Appl. No.: 11/052,437

(22) Filed: Feb. 7, 2005

(65) Prior Publication Data

US 2006/0175164 A1    Aug. 10, 2006

(51) Int. Cl.
*F16F 9/22* (2006.01)

(52) U.S. Cl. .................. 267/120; 188/300; 236/87; 236/92 C; 251/11

(58) Field of Classification Search ............. 188/300; 267/120, 64.12; 251/11; 236/92 C, 92 R
See application file for complete search history.

(56) References Cited

U.S. PATENT DOCUMENTS

| | | | |
|---|---|---|---|
| 3,552,427 A * | 1/1971 | Jacobson | 137/382 |
| 3,804,326 A * | 4/1974 | McIntire | 236/92 R |
| 3,896,958 A * | 7/1975 | Robbins et al. | 215/211 |
| 4,025,042 A * | 5/1977 | Doherty et al. | 236/101 C |
| 4,068,800 A * | 1/1978 | Doherty, Jr. | 236/101 C |
| 4,156,518 A * | 5/1979 | Ludwig | 251/11 |
| 4,408,751 A * | 10/1983 | Dodson et al. | 267/120 |
| 4,830,277 A * | 5/1989 | Hood | 236/93 R |
| 5,460,251 A | 10/1995 | Jeffries et al. | |
| 5,579,874 A | 12/1996 | Jeffries et al. | |
| 5,722,643 A | 3/1998 | Chamberlin et al. | |
| 5,895,053 A | 4/1999 | Bauman et al. | |
| 5,921,556 A | 7/1999 | Bauman et al. | |
| 5,921,557 A | 7/1999 | Bauman et al. | |
| 6,179,297 B1 | 1/2001 | Bauman et al. | |
| 6,425,279 B1 | 7/2002 | Jeffries | |
| 6,609,370 B2 | 8/2003 | Batchelor | |
| 6,629,585 B2 | 10/2003 | Williamson | |
| 6,959,921 B2 * | 11/2005 | Rose | 267/120 |

* cited by examiner

*Primary Examiner*—Christopher P Schwartz
(74) *Attorney, Agent, or Firm*—Baker Botts LLP

(57) ABSTRACT

A temperature compensating valve assembly comprising a bimetallic spring, an O-ring, a body and a cap. The cap has at least one nib to provide compression on the bimetallic spring. The bimetallic spring is retained between the cap and the body, and the bimetallic spring forms a seal with the O-ring in the temperature compensating valve assembly's closed position.

14 Claims, 8 Drawing Sheets open

PRIOR ART closed

PRIOR ART

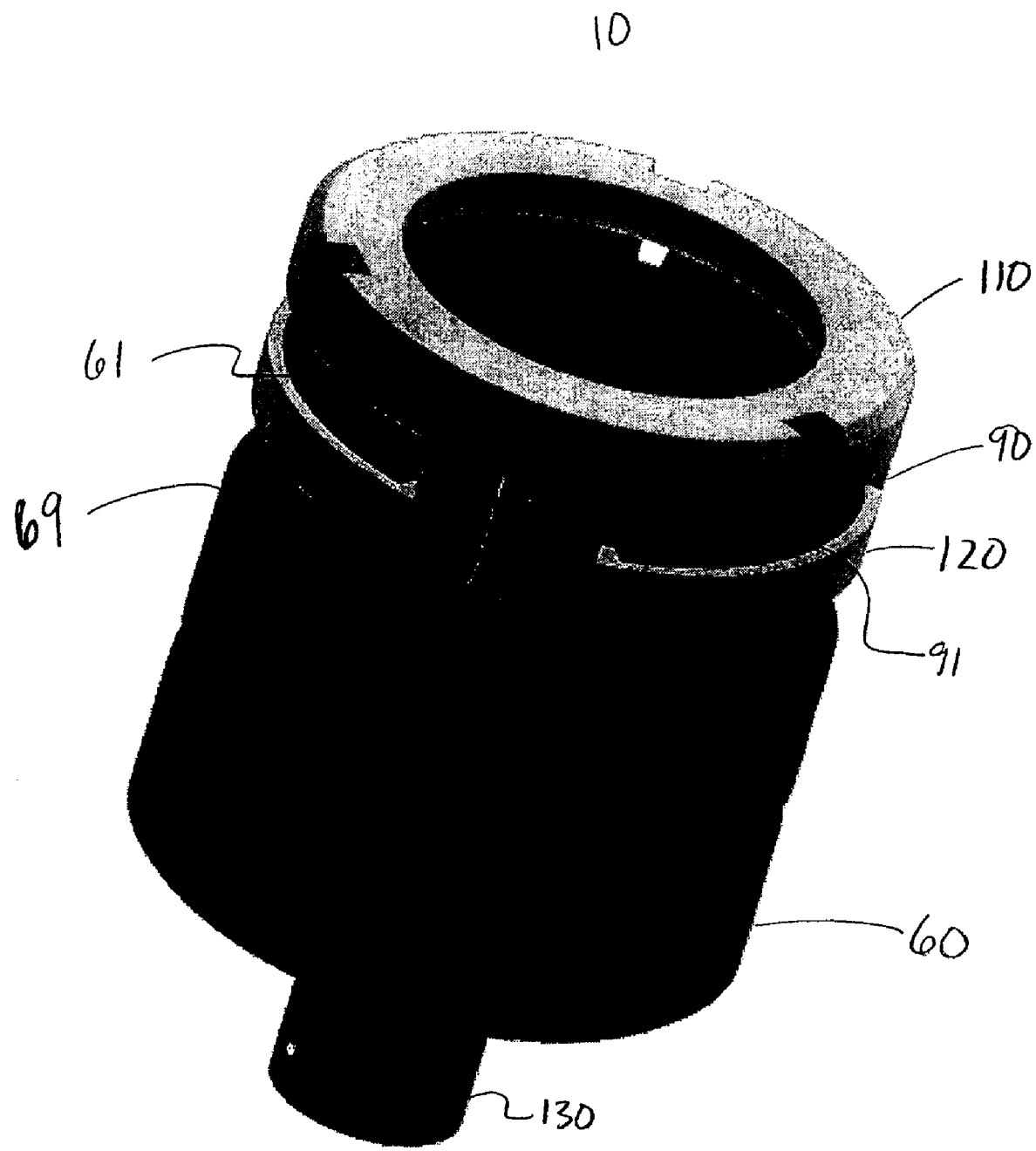

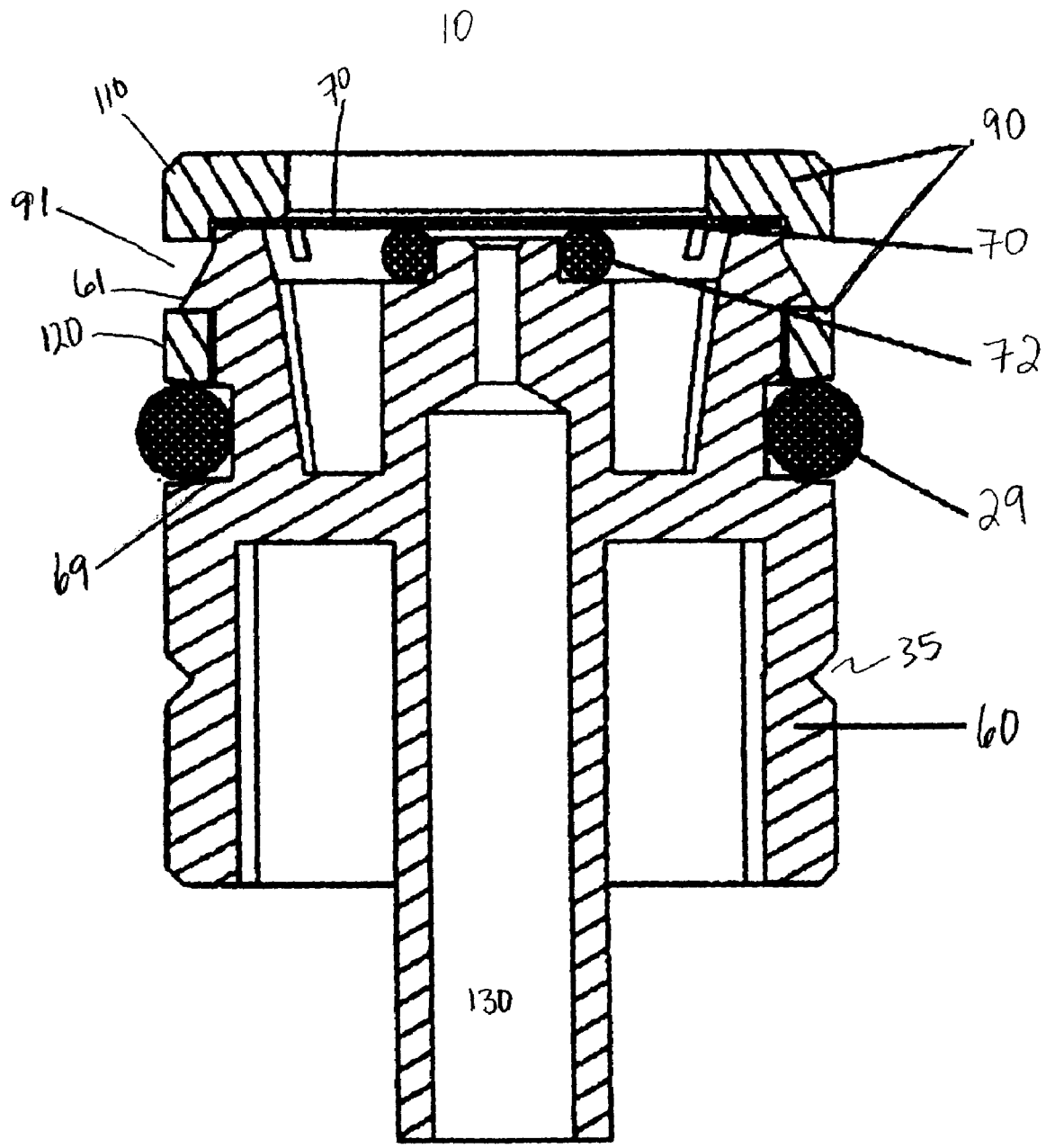

TEMPERATURE COMPENSATING VALVE ASSEMBLY

TECHNICAL FIELD OF THE INVENTION

The present invention relates generally to gas springs and, particularly, to gas springs of the type that are used primarily to lift and hold open the trunk lids, tailgates, hatchback lids, and engine compartment hoods of motor vehicles. More specifically, the invention relates to an improved temperature compensating valve assembly ("TCV assembly") for use in gas springs.

BACKGROUND OF THE INVENTION

Gas springs are widely used to partly or totally counterbalance the engine compartment hoods, trunk lids, rear windows and tailgates of passenger cars, station wagons, and vans to facilitate opening them and to hold them open at a nearly or fully open position. It is well-known that the force outputs of gas springs vary considerably with the temperature of the gas—at low temperatures the gas spring produces a force that can be very much lower than the force produced at high temperatures. It is necessary, therefore, to design a gas spring so that it produces a sufficient force to hold open the hood, tailgate or the like (hereinafter referred to as the "load") at a suitably selected low temperature. Ordinarily, gas springs are designed to provide a force of from about one to about five pounds over the load in the hold-open position of the load at the low temperature. At high temperatures, the hold-open force may increase by as much as 50 pounds, which means that the force required to move the load toward closed from the hold-open position (the "handle load") can be more than 50 pounds.

In addition to the problem of wide variations in the handle load as a function of temperature, the counterbalancing force exerted by the gas spring on the load at all positions of the load between closed and open varies widely with temperature. In cold weather, the gas spring force exerts a considerably lower counterbalancing force on the load than at high temperatures. Depending on the geometry of the gas spring/load system, the user may have to exert a relatively large force on the load during part or all of the movement of the load from closed to fully open in cold weather. In hot weather the gas spring force may move the load from closed to open without the intervention of the user under a relatively high opening force and at a relatively high speed, which can sometimes be disconcerting to an unwary user or can damage the load if there is an obstruction that prevents the load from fully opening.

Gas springs have an inherent problem when used to lift or hold open any flap, gate or hatch across the wide range of temperatures experienced in a normal operating environment. Due to the proportional effect of decreased temperature decreasing gas pressure in a known volume, at cold temperatures gas springs provide a reduced lift or extension force.

To offset this effect, a temperature compensating valve assembly (TCV assembly) is assembled into the gas spring body. The temperature compensating valve separates the gas chamber of the gas spring into two separate pressure chambers. When the valve is closed, for example at temperatures above 4° C., the gas spring functions only using a main pressure chamber. The gas spring provides output force based on the mass of gas and volume contained within the main pressure chamber.

At cold temperatures, for example below 4° C., the valve opens, allowing the gas spring to operate and provide an output force based on the volume of gas in the main pressure chamber and an additional volume. The additional volume is contained in a secondary pressure chamber. The secondary pressure chamber provides an increase in output force due to the inverse proportionality of pressure and volume.

A previously developed TCV assembly is shown in FIGS. 1A and 1B which is constructed of machined aluminum. Three O-rings 1, 2, 3 are used in the assembly. The O-ring 1 seals the valve in the gas spring tube body to provide separation for the two pressure chambers. Another O-ring 2 seals the valve spring in the "closed" position 200. Finally, the third O-ring 3 provides compression of the valve spring and prevents noise and rattling in the "open" position 300.

A bimetallic valve spring 4 is used to actuate the valve at a specific temperature range. The spring is disk-shaped, and seals the valve at temperatures above 4° C. by pressing against an O-ring 2 seal. Below 4° C., the spring disengages the O-ring 2 seal and allows gas to pass through the valve. The bimetallic spring 4 is held in place by means of a compression O-ring 3 that is retained by cold forming a lip on the valve body. Different types of bimetallic springs 4 may be used. The temperature at which the different bimetallic springs 4 respond may be lower or higher than 4° C.

The TCV assembly of FIGS. 1A and 1B is composed of a one-piece machined aluminum assembly that holds the bimetallic spring in place and is sealed after manufacturing. It is difficult to perform maintenance after manufacturing. And it is also difficult to replace the bimetallic spring should it need replacing. There are also too many components, including three O-rings in the TCV Assembly, making manufacture complex and expensive.

There is a need to improve the functional characteristics of the TCV assembly. There is a need to reduce the number of components needed to construct the TCV assembly and to reduce the complexity of the assembly. There is also a need to improve the materials used to make the TCV assembly stronger and to improve the construction method. There is also a need for a TCV assembly that is easy to perform maintenance on.

SUMMARY OF THE INVENTION

An object of the present invention is to provide a TCV assembly with improved functional characteristics. Another object is to provide a TCV assembly with a reduced number of components. Another object is to provide a TCV assembly with reduced complexity. Yet another object is to provide a TCV assembly with improved materials and ease of maintenance.

The objects referred to above are attained, in accordance with the present invention, by a TCV assembly including a cap and a body. A bimetallic spring is retained between the cap and body. An O-ring provides a seal with the bimetallic spring in valve closed position. The cap and body may be assembled using a snap-tab construction method. The cap has small plastic nibs to provide compression on the bimetallic spring during the open position. The TCV assembly body can be constructed from polymer composite materials.

DESCRIPTION OF THE DRAWINGS

For a more complete understanding of the present invention, and the advantages thereof, reference may be made to the following description of exemplary embodiments, taken in conjunction with the accompanying drawings, in which:

FIG. 2 is a perspective view of one embodiment of the present invention.

FIG. 3 is a schematic cross-sectional view of one embodiment of the present invention.

DESCRIPTION OF THE EMBODIMENTS

As shown in FIGS. 2-10, the TCV assembly 10 has a body 60 and a cap 90. As shown in FIG. 3, a bimetallic spring 70 is retained between the body 60 and cap 90. The bimetallic spring 70 can be disk shaped. The body 60 and cap 90 are preferably made of polymer composite materials. This provides strength and resilience to the TCV assembly 10. Other materials may also be used to fabricate the body 60 and cap 90. The cap 90 fits and locks with the body 60 to hold the bimetallic spring 70 in place.

Figure 8:
FIG. 8 is a schematic side cross-sectional view of a portion of the cap of one embodiment of the present invention.

The cap 90 has an upper portion 110 and a lower portion 120. As shown in FIG. 8, the upper portion 110 of the cap 90 has at least one nib 71 to provide compression on the bimetallic spring 70 when the TCV assembly 10 is in the open position (not shown). The at least one nib 71 compresses the bimetallic spring 70 to prevent it from rattling and to hold it in place. The at least one nib 71 is preferably made of plastic, but can also be made of other suitable materials. The at least one nib 71 is preferably at an angle of about 10° from vertical.

As shown in FIG. 3, the TCV assembly 10 has an O-ring 72. The O-ring 72 is located below the bimetallic spring 70 and seals the bimetallic spring 70 when the TCV assembly 10 is in the closed position, as shown in FIG. 3. In the open position (not shown), the bimetallic spring bends away and disengages from the O-ring 72 which provides an opening to a hollow portion 130 which leads to the main pressure chamber of a gas spring tube. When temperatures decrease, for example, below 4° Celsius, the bimetallic spring 70 curves away and disengages from the O-ring 72 in the open position (not shown). The temperature at which the bimetallic spring 70 curves away varies depending on the material that the bimetallic spring 70 is made of. Different types of bimetallic springs can be used to function at different temperatures.

Figure 1A:
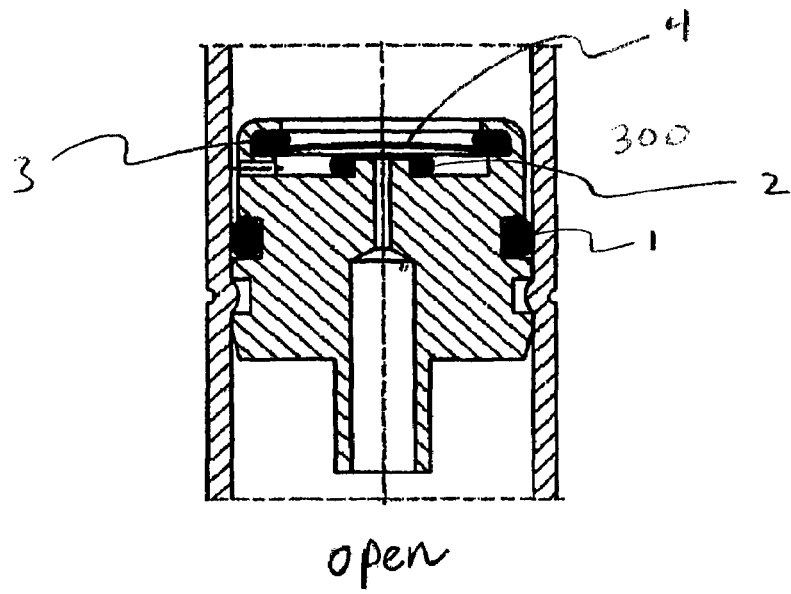
FIG. 1A is a side cross-sectional view of a gas spring embodying a prior design for a TCV assembly in the open position.
Figure 1B:
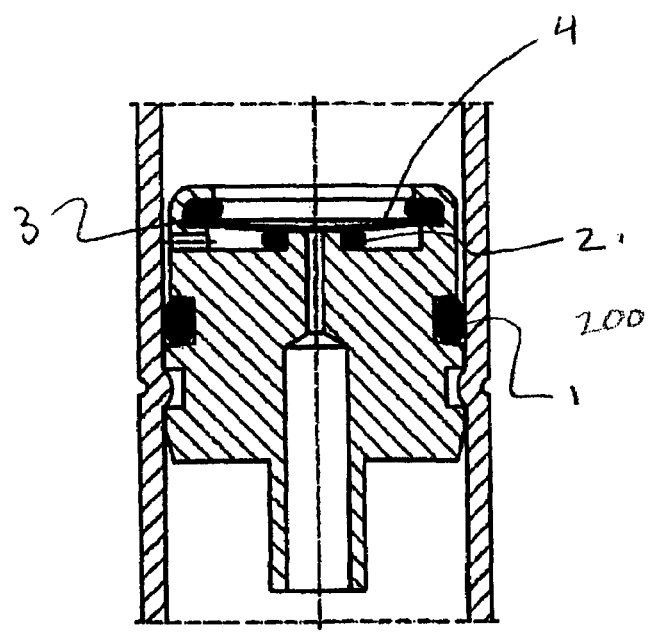
FIG. 1B is a side cross-sectional view of a gas spring embodying a prior design for a TCV assembly in the closed position
Figure 4:
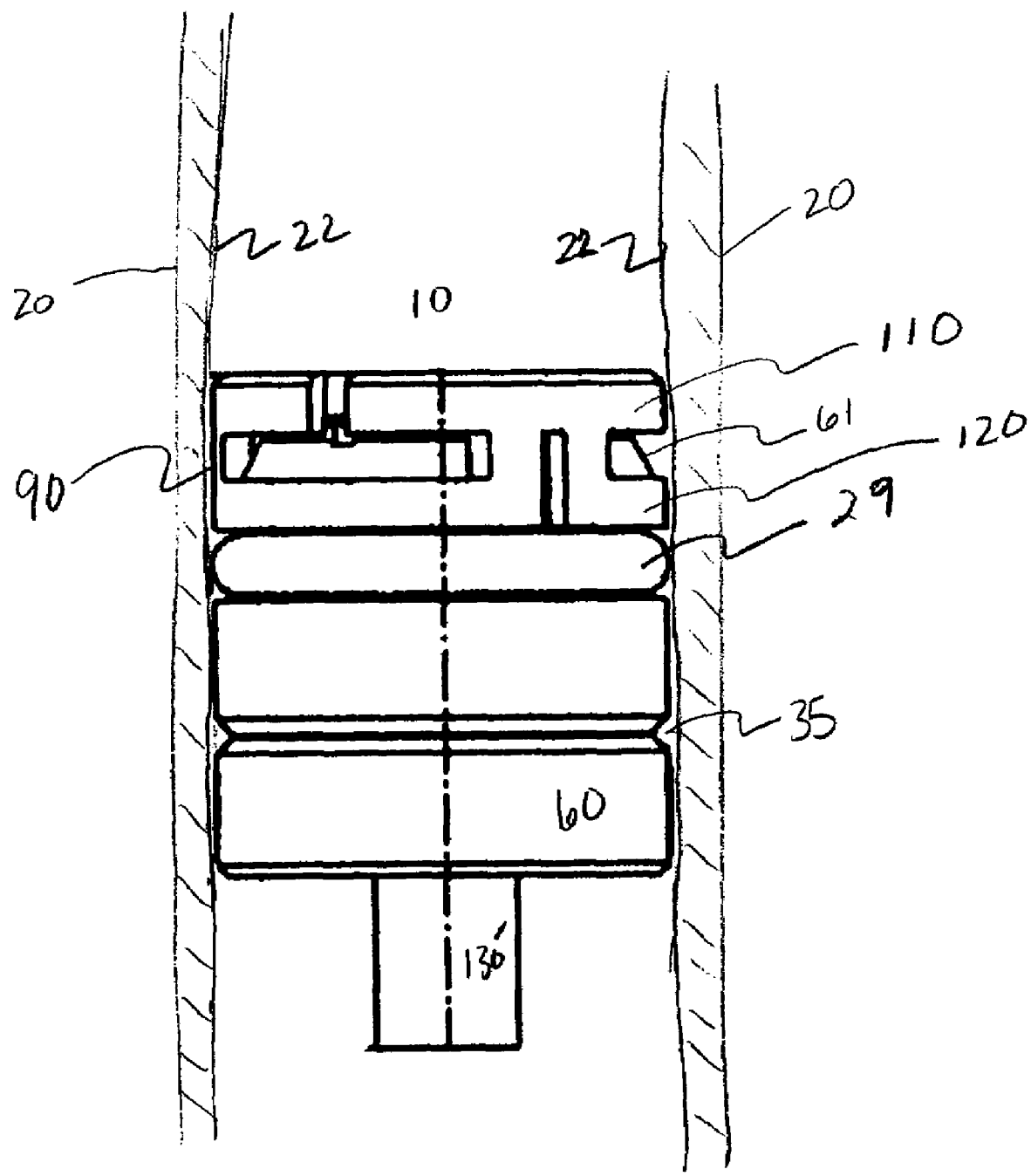
FIG. 4 is a side view of one embodiment of the present invention.
Figure 5:
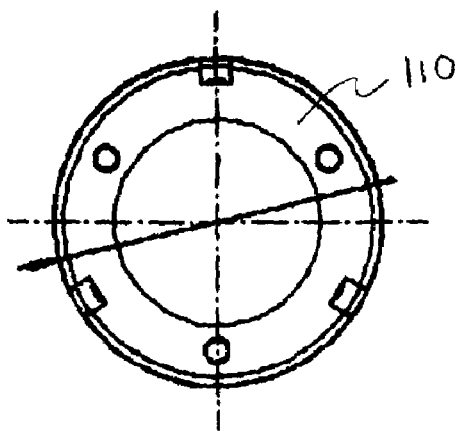
FIG. 5 is a top view of one embodiment of the present invention.
Figure 6:
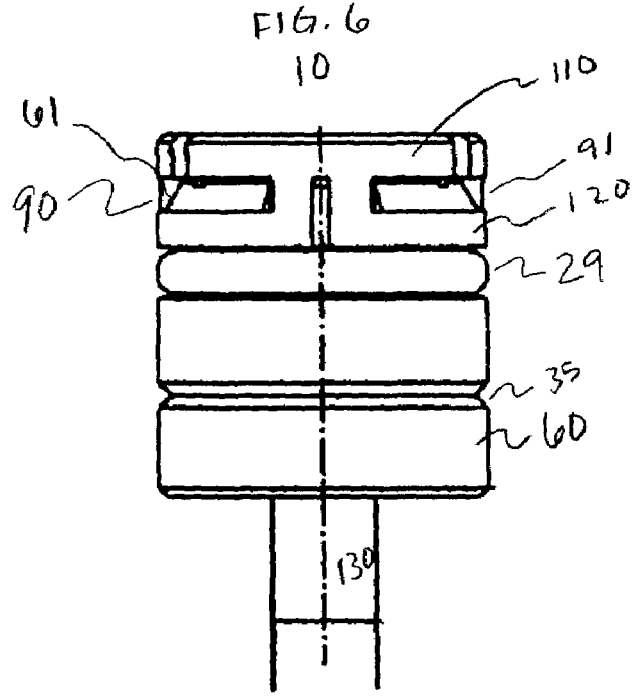
FIG. 6 is a side view of one embodiment of the present invention.
Figure 7:
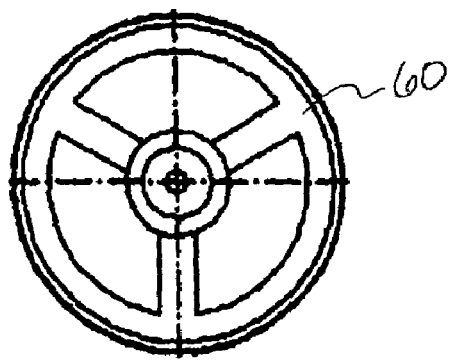
FIG. 7 is a bottom view of one embodiment of the present invention.

As shown in FIGS. 3, 4 and 6, the body 60 has at least one snap tab 61 for engaging with at least one opening 91 in the cap 90.

Figure 9:
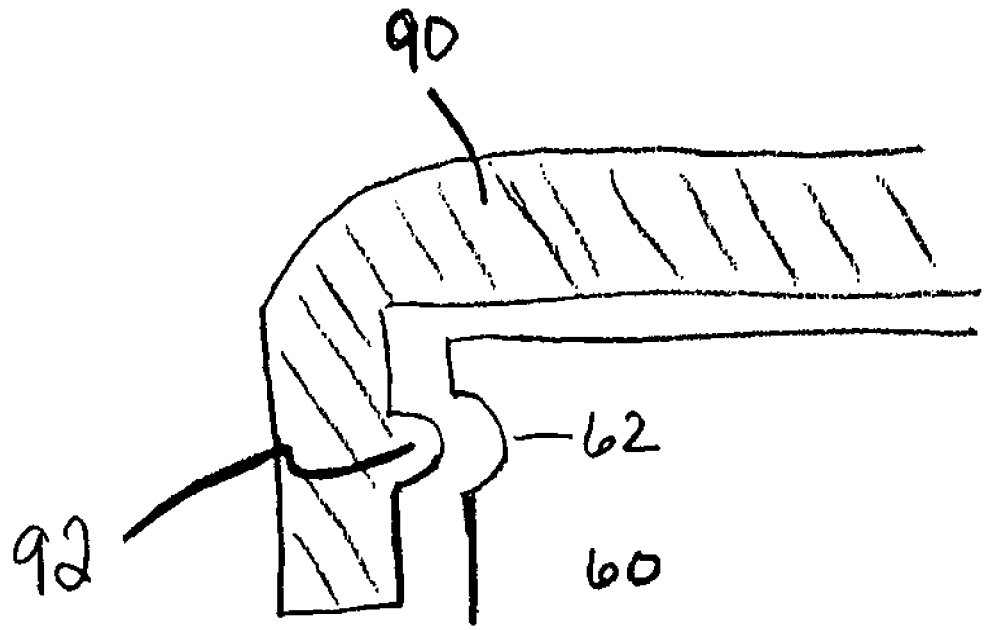
FIG. 9 is a schematic side cross-sectional view of a portion of one embodiment of the present invention.

In another embodiment as shown in FIG. 9, the body 60 has at least one retention groove 62 for receiving at least one curved piece 92 which is part of or attached to the cap 90.

Figure 10:
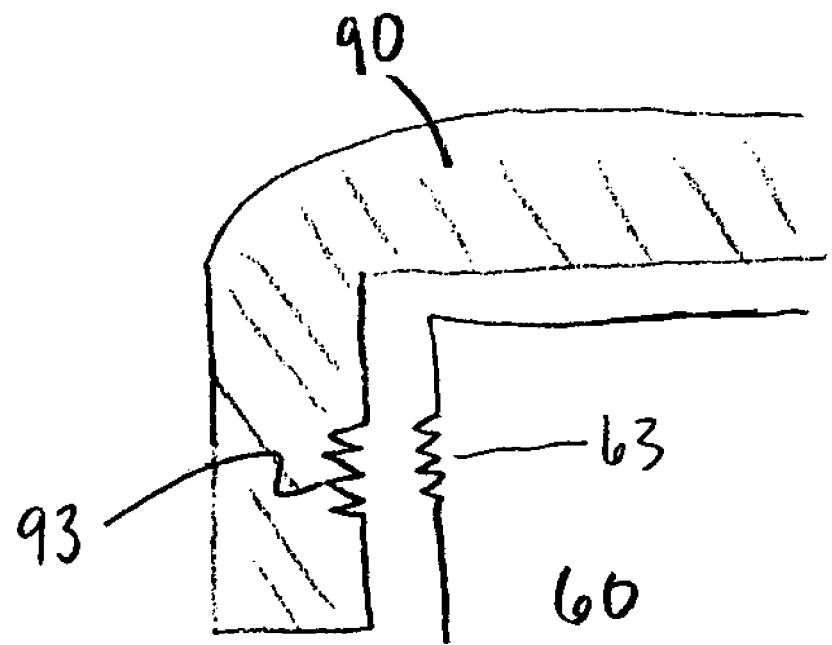
FIG. 10 is a schematic side cross-sectional view of a portion of one embodiment of the present invention.

In another embodiment as shown in FIG. 10, the body 60 has a threaded portion 63 for engaging with a threaded portion 93 of the cap 90.

As shown in FIG. 4, the TCV assembly 10 is assembled into a gas spring tube 20 which is in the shape of a tube or long cylinder. As shown in FIG. 3, the body 60 has a rectangular opening 69 for holding an O-ring 29. The O-ring 29 forms a seal with the interior 22 of the gas spring tube 20, as shown in FIGS. 3, 4, 6.

Figure 11:
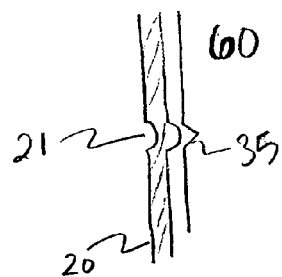
FIG. 11 is a schematic side cross-sectional view of a portion of one embodiment of the present invention.

As shown in FIG. 11, the gas spring tube 20 may have a tube groove 21 for receiving the TCV assembly 10 and holding the TCV assembly 10 in place. In this embodiment the body 60 of the TCV assembly 10 has a diagonal notch 35 for engaging the tube groove 21 and forming a seal with the gas spring tube 20.

Figure 12:
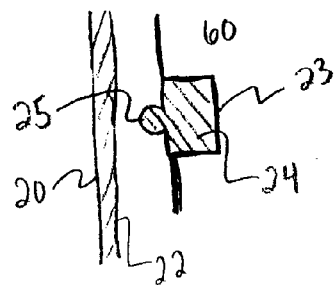
FIG. 12 is a schematic side cross-sectional view of a portion of one embodiment of the present invention.

As shown in FIG. 12, alternatively, the gas spring tube 20 may be have a smooth interior 22 with no grooves. In this embodiment, the body 60 of the TCV assembly 10 may have a rectangular notch 23 which holds a molded elastomer insert 24. The molded elastomer insert 24 has a curved portion 25 which forms a seal against the interior 22 of the gas spring tube 20.

Figure 13:
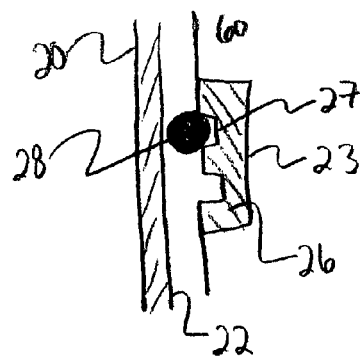
FIG. 13 is a schematic side cross-sectional view of a portion of one embodiment of the present invention.

As shown in FIG. 13, in another embodiment, the body 60 has a rectangular notch 23. However, in this embodiment, there is a molded metal retainer 26 which also has at least one notch 27 for holding an O-ring 28. The O-ring 28 forms a seal with the interior 22 of the gas spring tube 20.

In another embodiment (not shown), the body 60 may be press fit into the gas spring tube 20.

Figure 14:
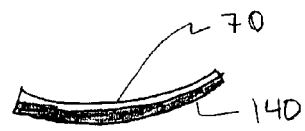
FIG. 14 is a side view of a portion of one embodiment of the present invention.
Figure 15:
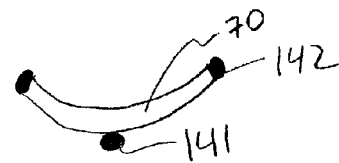
FIG. 15 is a side view of a portion of one embodiment of the present invention.

As shown in FIG. 14, the bimetallic spring 70 may be coated with a sealing material 140 for additionally sealing with the O-ring 72. Alternatively, as shown in FIG. 15, molded elastomer pieces 141, 142 provide additional sealing properties.

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the invention.

We claim:

1. A temperature compensating valve assembly comprising:
    a bimetallic spring,
    an O-ring,
    a body and a cap, said cap having at least one nib at an angle of approximately 10° from vertical to provide compression on said bimetallic spring, wherein the bimetallic spring is retained between said cap and said body, and wherein said bimetallic spring forms a seal with said O-ring in said temperature compensating valve assembly's closed position.

2. The temperature compensating valve assembly of claim 1 wherein the body and cap are made from polymer composite materials.

3. The temperature compensating valve assembly of claim 1 wherein said body has at least one snap tab for engaging with at least one opening in said cap thereby locking said body and cap together.

4. The temperature compensating valve assembly of claim 1 wherein said body has a retention groove and said cap has at least one curved portion protruding from its exterior and wherein said curved portion fits into said retention groove thereby locking said body and cap together.

5. The temperature compensating valve assembly of claim 1 wherein said body has a threaded portion on its exterior and wherein said cap has a corresponding threaded portion which screws into said body thereby locking said body and cap together.

6. The temperature compensating valve assembly of claim 1 further comprising an additional O-ring located in an opening on an exterior part of the body, said additional O-ring forming a seal with an interior side of a gas spring inside which the temperature compensating valve assembly is located.

7. The temperature compensating valve assembly of claim 1 wherein an exterior part of the body has a rectangular notch, said notch holding a molded elastomer insert, said molded elastomer insert having a curved portion which forms a seal with an interior side of a gas spring inside which the temperature compensating valve assembly is located.

8. The temperature compensating valve assembly of claim 1 wherein an exterior part of the body has a rectangular notch, said notch holding a molded metal retainer, said molded metal retainer having at least one notch for housing an additional O-ring, said additional O-ring forming a seal with an interior side of a gas spring inside which the temperature compensating valve assembly is located.

9. The temperature compensating valve assembly of claim 1 wherein the body is press fit into a gas spring inside which the temperature compensating valve assembly is located.

10. The temperature compensating valve assembly of claim 1 wherein the bimetallic spring has a sealing material affixed to it for engaging with the O-ring.

11. The temperature compensating valve assembly of claim 1, wherein said nib is configured to operatively engage said bimetallic spring when said temperature compensating valve is in an open position.

12. The temperature compensating valve assembly of claim 1, wherein at least a portion of said cap contacts at least a portion of said bimetallic spring.

13. A temperature compensating valve assembly comprising
   a bimetallic spring,
   an O-ring,
   a body and a cap, said cap having at least one nib to provide compression on said bimetallic spring, wherein the bimetallic spring is retained between said cap and said body, and wherein said bimetallic spring forms a seal with said O-ring in said temperature compensating valve assembly's closed position,
   wherein an exterior part of the body has a diagonal notch for forming a seal with a tube groove on an interior side of a gas spring inside which the temperature compensating valve assembly is located.

14. A temperature compensating valve assembly comprising
   a bimetallic spring,
   an O-ring,
   a body and a cap, said cap having at least one nib to provide compression on said bimetallic spring, wherein the bimetallic spring is retained between said cap and said body, and wherein said bimetallic spring forms a seal with said O-ring in said temperature compensating valve assembly's closed position,
   wherein the bimetallic spring has molded elastomer pieces attached to two ends and its center.

* * * * *